United States Patent
Oh et al.

(10) Patent No.: US 11,230,236 B2
(45) Date of Patent: Jan. 25, 2022

(54) METHOD AND SYSTEM FOR MONITORING VEHICLE BOTTOM CONDITION

(71) Applicants: Hyundai Motor Company, Seoul (KR); Kia Motors Corporation, Seoul (KR)

(72) Inventors: Min Hyuk Oh, Seoul (KR); Kyo Woong Choo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/073,825

(22) Filed: Oct. 19, 2020

(65) Prior Publication Data
US 2021/0261069 A1 Aug. 26, 2021

(30) Foreign Application Priority Data
Feb. 25, 2020 (KR) .................. 10-2020-0022819

(51) Int. Cl.
| | |
|---|---|
| *B60R 11/04* | (2006.01) |
| *G06T 7/292* | (2017.01) |
| *G06K 9/00* | (2006.01) |
| *G06K 9/62* | (2006.01) |
| *G06T 7/70* | (2017.01) |

(52) U.S. Cl.
CPC .......... *B60R 11/04* (2013.01); *G06K 9/00791* (2013.01); *G06K 9/6202* (2013.01); *G06T 7/292* (2017.01); *G06T 7/70* (2017.01); *G06T 2207/30252* (2013.01)

(58) Field of Classification Search
None
See application file for complete search history.

(56) References Cited

U.S. PATENT DOCUMENTS

2017/0372147 A1* 12/2017 Stervik .............. G06K 9/00791

FOREIGN PATENT DOCUMENTS

| KR | 101492114 B1 | 2/2015 |
|---|---|---|
| KR | 2019-0094005 A | 8/2019 |

* cited by examiner

*Primary Examiner* — James M Anderson, II
(74) *Attorney, Agent, or Firm* — Mintz Levin Cohn Ferris Glovsky and Popeo, P.C.; Peter F. Corless

(57) ABSTRACT

A method of monitoring a vehicle bottom condition is provided. in which forward, left-side, right-side, and rear images of a vehicle are received from a camera unit of the vehicle, and traveling distance information of the vehicle is received from a sensor unit of the vehicle. The images received from the camera unit based on the traveling distance information received from the sensor unit are stored. A vehicle bottom image is then generated based on the stored image, the generated vehicle bottom image is matched with a surround view monitoring (SVM) image of the vehicle, and the SVM image matched with the vehicle bottom image is output.

19 Claims, 6 Drawing Sheets

METHOD AND SYSTEM FOR MONITORING VEHICLE BOTTOM CONDITION

CROSS-REFERENCE TO RELATED APPLICATION(S)

This application claims the benefit of Korean Patent Application No. 10-2020-0022819, filed on Feb. 25, 2020, which is hereby incorporated by reference as if fully set forth herein.

BACKGROUND

Field of the Disclosure

The present disclosure relates to a method and system for monitoring a vehicle bottom condition.

Discussion of the Related Art

In general, a driver operating a vehicle reaches a desired destination by manipulating a vehicle to go straight, to change a direction to the left or the right, or to go backward and then needs to park the vehicle upon arrival while still sitting in the driver seat. To drive or park the vehicle to or at the destination, the driver needs to manipulate the vehicle while looking to the left, right, and rear sides of the vehicle as well as looking forward.

A conventional vehicle includes a surround view camera (SVM), a rear view camera (RVC), a blind view monitor (BVM), or the like and monitors forward, rear, left, and right sides of the vehicle. The DVM is a system that displays a surrounding image of the vehicle and displays an image of left, right, forward, and rear sides of the vehicle while the vehicle travels backward or travels at low speed. The RVC is a system that displays an image of a rear side of the vehicle. The BVM is a system that displays a lateral image based on a direction in which a turn signal is operated when the turn signal is operated during the vehicle travels.

However, the conventional vehicle is only capable of monitoring a region around the vehicle but is not capable of monitoring a condition of a region below the vehicle while traveling on a rough or uneven road such as driving over a sink hole or an unpaved road when a sink hole or an unpaved road is positioned below the vehicle.

SUMMARY

Accordingly, the present disclosure provides a method of monitoring a vehicle bottom condition to monitor a bottom portion of a vehicle. The technical problems solved by the exemplary embodiments are not limited to the above technical problems and other technical problems which are not described herein will become apparent to those skilled in the art from the following description.

To achieve these objects and other advantages and in accordance with the purpose of the invention, as embodied and broadly described herein, a method of monitoring a vehicle bottom condition may include receiving forward, left-side, right-side, and rear images of a vehicle from a camera of the vehicle, and moving distance or traveling distance information of the vehicle from a sensor of the vehicle, storing the image received from the camera based on the moving distance information received from the sensor, generating the vehicle bottom image based on the stored image, matching the generated vehicle bottom image with a surround view monitoring (SVM) image of the vehicle, and outputting the SVM image matched with the vehicle bottom image.

In some exemplary embodiments, the generating of the vehicle bottom image in response to driving of the vehicle may include generating a first frame of the vehicle bottom image based on the stored image, and after the generating the first frame, combining the forward or rear image with an existing frame based on a moving distance and storing the vehicle bottom image. In addition, the generating of the first frame of the vehicle bottom image based on the stored image may include receiving forward driving or backward driving information by the vehicle, and generating a vehicle bottom image in response to driving of the vehicle.

The generating of the vehicle bottom image in response to driving of the vehicle may include, when the vehicle travels forward, generating a forward image of the vehicle bottom image by combining forward images of the stored image based on a moving distance. Additionally, the generating the vehicle bottom image may include generating a rear image of the vehicle bottom image.

The method may further include, when a size of the combined forward image is the same as sum of an overall length of the vehicle and a size of a first forward image, storing the combined forward image as a first frame of the forward image of the vehicle bottom image. In some exemplary embodiments, the generating of the vehicle bottom image in response to driving of the vehicle may include, when the vehicle travels backward, generating the vehicle bottom image by combining rear images of the stored image based on a moving distance.

In addition, the generating of the vehicle bottom image may further include generating a rear image of the vehicle bottom image. The method may further include, when a size of the combined rear image is the same as an overall length of the vehicle, storing the combined rear image as a first frame of the rear image of the vehicle bottom image.

Further, the storing of the vehicle bottom image may include storing each of forward and rear images of the vehicle bottom image, having a size up to twice an overall length of the vehicle. The matching of the generated vehicle bottom image with the surround view monitoring (SVM) image of the vehicle may include comparing and matching the frame stored based on the moving distance with current left-side and right-side image frames based on left-side and right-side images that are currently displayed on the SVM.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
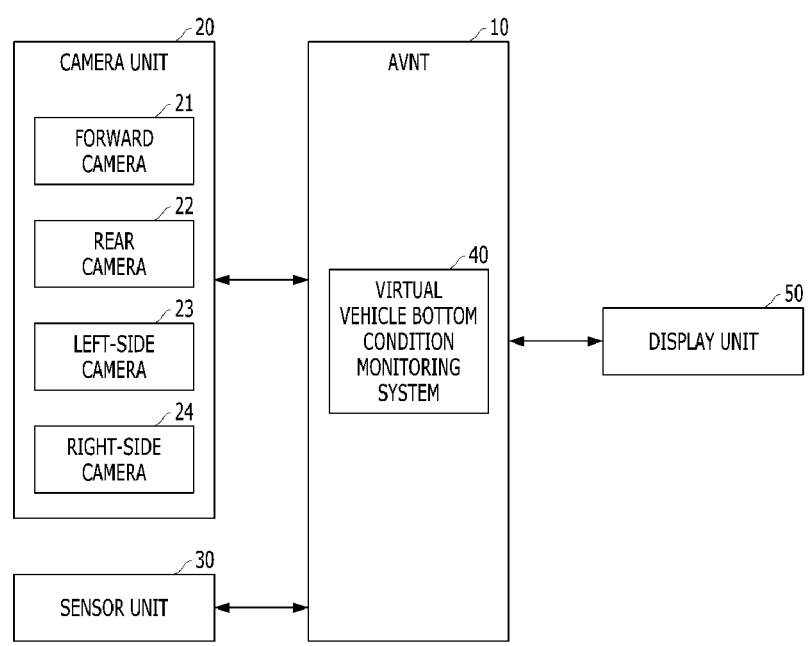
FIG. 1 is a block diagram showing a configuration of a vehicle bottom condition monitoring system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference will now be made in detail to the exemplary embodiments of the present disclosure, examples of which are illustrated in the accompanying drawings. The suffixes "module" and "unit" of elements herein are used for convenience of description and thus can be used interchangeably and do not have any distinguishable meanings or functions.

In the description of exemplary embodiments, it will be understood that, when an element is referred to as being "on", "under", "before" or "after" another element, the element can be directly on the other element, or intervening elements may be present.

It will be understood that, although the terms "first", "second", "A", "B", "(a)", "(b)", etc. may be used herein to describe various elements of the present disclosure, these terms are only used to distinguish one element from another element, and the essential order or sequence of corresponding elements is not limited by these terms. It will be understood that when one element is referred to as being "connected to", "coupled to", or "accessing" another element, the one element may be "connected to" or "coupled to" or "access" the other element via a further element, or the one element may be directly connected to or directly access another element.

The terms "comprises", "includes", and "has" described herein should be interpreted not to exclude other elements but to further include such other elements since the corresponding elements may be included unless specifically mentioned otherwise. All terms including technical or scientific terms have the same meanings as those generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

FIG. 1 is a block diagram showing a configuration of a vehicle bottom condition monitoring system according to an exemplary embodiment of the present disclosure. As shown in FIG. 1, the vehicle bottom condition monitoring system for providing a vehicle bottom monitoring image according to the present disclosure may include an audio, video, navigation, telematics (AVNT) 10, a camera unit 20, a sensor unit 30, a virtual vehicle bottom condition monitoring system 40, and a display unit 50. Each of the components may be operated by an overall vehicle controller.

The AVNT 10 may be installed within a vehicle and may integrate an audio and multimedia device, a camera display, and the like. The AVNT 10 may be configured to generate a surround view monitoring (SVM) image that outputs a surrounding image of the vehicle based on a camera image. The camera unit 20 may include a forward camera 21, a rear camera 22, a left-side camera 23, and a right-side camera 24 as a camera configured to capture an image of a region around a vehicle. The cameras 21, 22, 23, and 24 may be configured to transfer images of forward, rear, left, and right sides to the AVNT 10, respectively.

The forward camera 21 may be positioned on a front surface of the vehicle and may be used to acquire a forward image of the vehicle. In particular, the forward camera 21 may be positioned on a central portion between opposite head lamps of the vehicle, but the present disclosure is not limited thereto. The rear camera 22 may be positioned on a rear surface of the vehicle and may be used to acquire a rear image of the vehicle. In particular, the rear camera 22 may be positioned on a central portion between opposite rear lamps of the vehicle, but the present disclosure is not limited thereto.

The left-side camera 23 may be positioned on a left-side surface of the vehicle and may be used to acquire a left-side image of the vehicle. In particular, the left-side camera 23 may be positioned below a left side mirror of the vehicle, but the present disclosure is not limited thereto. The right-side camera 24 may be positioned on a right-side surface of the vehicle and may be used to acquire a right-side image of the vehicle. In particular, the right-side camera 24 may be positioned below a right side mirror of the vehicle, but the present disclosure is not limited thereto.

The sensor unit 30 may be configured to sense a signal related to driving of a vehicle 100 or the like. The sensor unit 30 may include a plurality of sensors mounted on the vehicle. Accordingly, the sensor unit 30 may be configured to acquire a sensing signal of vehicle position information (e.g., global positioning system (GPS_information) and a vehicle moving distance d (e.g., traveling distance). The virtual vehicle bottom condition monitoring system 40 may be included in an AVNT system of a vehicle and may be a separate system disposed in the vehicle, but the present disclosure is not limited thereto.

The virtual vehicle bottom condition monitoring system 40 may be a software module that generates an image from the plurality of cameras 21, 22, 23, and 24 and an image of a part of a bottom of the vehicle based on the vehicle moving distance d received from the sensor unit 30. In particular, the virtual vehicle bottom condition monitoring system 40 may be configured to generate a combined forward image using an image captured by the forward camera 21 of the vehicle. The virtual vehicle bottom condition monitoring system 40 may be configured to generate a combined rear image using an image captured by the rear camera 22 of the vehicle.

Additionally, the virtual vehicle bottom condition monitoring system 40 may be configured to generate a combined left-side image using an image captured by the left-side camera 23 of the vehicle. The virtual vehicle bottom condition monitoring system 40 may be configured to generate a combined right-side image using an image captured by the right-side camera 24 of the vehicle. The virtual vehicle bottom condition monitoring system 40 may further be configured to receive forward, left-side, right-side, and rear images of the vehicle from the camera unit 20 and receive the vehicle moving distance d of the vehicle from the sensor unit 30. Then, the virtual vehicle bottom condition monitoring system 40 may be configured to store the forward, left-side, right-side, and rear images of the vehicle based on the vehicle moving distance d of each vehicle.

When the SVM mode is executed, the virtual vehicle bottom condition monitoring system 40 may be configured to match a vehicle bottom image generated based on each of images captured by the cameras 21 to 24 with an SVM image generated by the AVNT to generate an SVM image including the vehicle bottom image. The virtual vehicle bottom condition monitoring system 40 may then be configured to output the SVM image including the vehicle bottom image to a user through the display unit 50. The display unit 50 may be configured to output media, video, camera images, or the like, which is created by the AVNT 10 and the virtual vehicle bottom condition monitoring system 40, to a driver. The display unit 50 may include various displays mounted within the vehicle.

Figure 2:
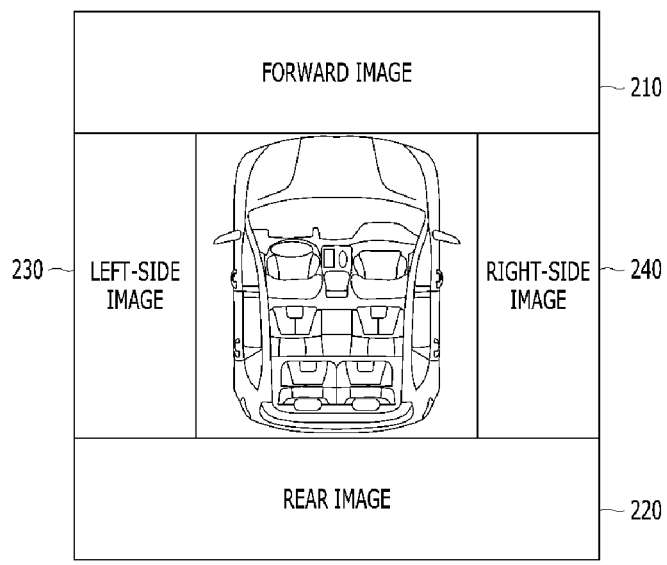
FIG. 2 is a diagram showing a surround view monitoring (SVM) of a vehicle according to an exemplary embodiment of the present disclosure.

FIG. 2 is a diagram showing an SVM of a vehicle according to an exemplary embodiment of the present disclosure. Referring to FIG. 2, the AVNT 10 may be configured to generate a surround view monitoring (SVM) image that outputs a surrounding image of the vehicle based on a camera image. In particular, the SVM image may be configured to generate a forward image 210 captured by the forward camera 21, a rear image 220 captured by the rear camera 22, a left-side image 230 captured by the left-side camera 23, and a right-side image 240 captured by the right-side camera 24

Figure 3:
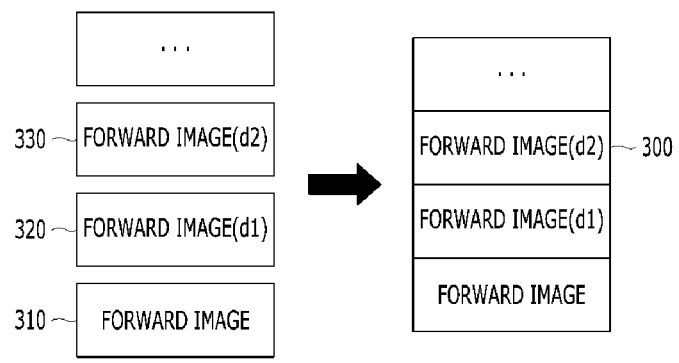
FIGS. 3 to 5 are diagrams showing a method of generating a vehicle bottom image according to an exemplary embodiment of the present disclosure.
Figure 4:
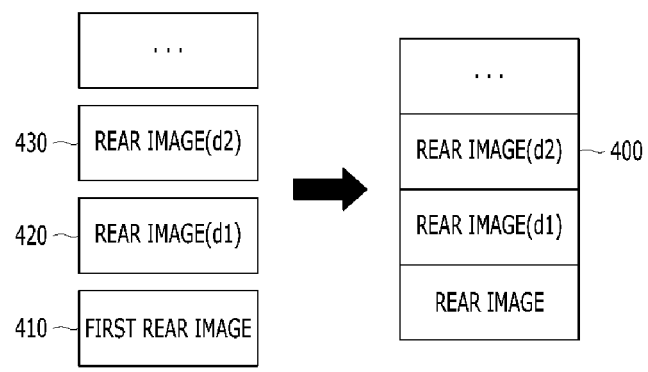
Figure 5:
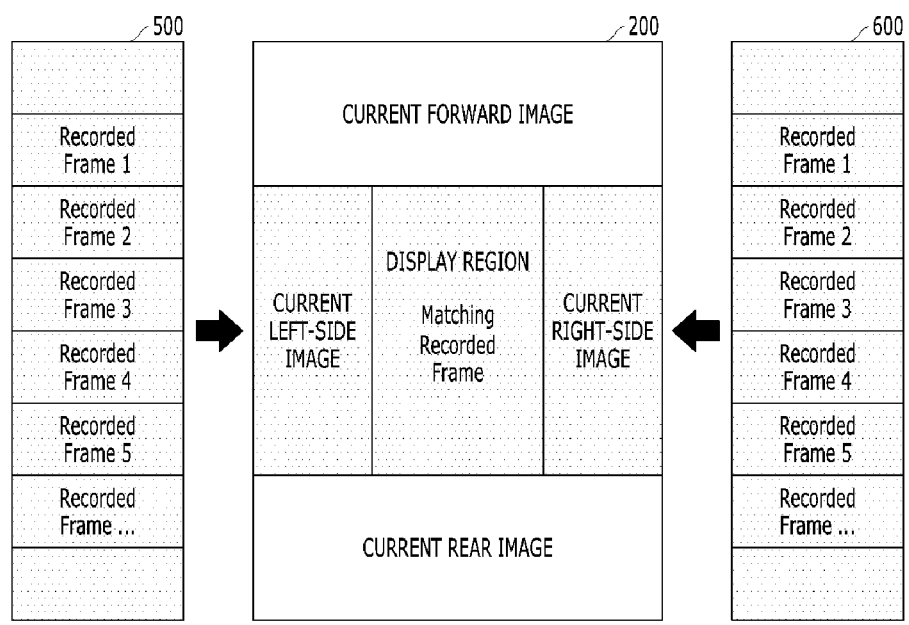

FIGS. 3 to 5 are diagrams showing a method of generating a vehicle bottom image according to an exemplary embodiment of the present disclosure. Referring to FIG. 3, in response to receiving forward driving information of a vehicle, the virtual vehicle bottom condition monitoring system 40 may be configured to generate the vehicle bottom image based on a forward image stored depending on a vehicle moving distance.

The virtual vehicle bottom condition monitoring system 40 may then be configured to combine forward images stored based on a moving distance with a first forward image 310 of the vehicle to generate a forward image of the vehicle bottom image. In other words, the virtual vehicle bottom condition monitoring system 40 may be configured to combine a forward image 320 based on a first moving distance d1 with the first forward image 310, combine an image, obtained by combining the first forward image 310 and the forward image 320 based on the first moving distance d1, with a forward image 33 based on a second moving distance d2, and may be configured to repeatedly perform this (e.g., repeat these steps) to generate a forward image 300 of the vehicle bottom image.

Particularly, in response to determining that the size of the combined forward image is the same as the sum of the overall length of a vehicle and the size of the first forward image 310, the virtual vehicle bottom condition monitoring system 40 may be configured to store the combined forward image as a first frame of the forward image 300 of the vehicle bottom image. When generating the forward image 300 of the vehicle bottom image, the virtual vehicle bottom condition monitoring system 40 may be configured to store moving distance information based on odometer together from the first frame. The virtual vehicle bottom condition monitoring system 40 may be configured to attach the forward image including moving distance information to an existing frame based on a distance and store the forward image after the first frame is completed.

Referring to FIG. 4, in response to receiving backward driving information of the vehicle, the virtual vehicle bottom condition monitoring system 40 may be configured to generate the vehicle bottom image based on a rear image stored based on a moving distance of the vehicle. The virtual vehicle bottom condition monitoring system 40 may then be configured to combine the forward image stored based on a moving distance to a first rear image 410 of the vehicle to generate the rear image of the vehicle bottom image.

In other words, the virtual vehicle bottom condition monitoring system 40 may be configured to combine a rear image 420 based on the first moving distance d1 with the first rear image 410, combine a rear image 430 based on the second moving distance d2 with an image, obtained by combining the first rear image 410 and the rear image 420 based on the first moving distance d1, and may be configured to repeatedly perform this process to generate a first frame of a rear image 400 of the vehicle bottom image. Particularly, when the size of the combined rear image is the same as the overall length of a vehicle, the virtual vehicle bottom condition monitoring system 40 may be configured to store the combined rear image as a first frame of the rear image 400 of the vehicle bottom image.

When generating the rear image of the vehicle bottom image, the virtual vehicle bottom condition monitoring system 40 may be configured to store moving distance information based on odometer together from the first frame. The virtual vehicle bottom condition monitoring system 40 may then be configured to attach the rear image including moving distance information to an existing frame based on a distance and store the rear image after the first frame is completed.

Then, after the first frame is completed, the virtual vehicle bottom condition monitoring system 40 may be configured to combine the forward or rear image to each existing frame based on a moving distance and store the forward or rear image. As necessary, the virtual vehicle bottom condition monitoring system 40 may be configured to further generate the left-side and right-side images as well as the forward or rear image. Particularly, the virtual vehicle bottom condition monitoring system 40 may be configured to store each of forward and rear images having a size up to twice the maximum overall length of the vehicle in consideration of all situations such as forward driving and backward driving of the vehicle.

FIG. 5 is a diagram showing a matching method of a vehicle bottom image according to an exemplary embodiment of the present disclosure. Referring to FIG. 5, the virtual vehicle bottom condition monitoring system 40 may be configured to perform monitoring and comparison-analysis on surrounding images to display a vehicle bottom image on the display unit 50. In particular, the virtual vehicle bottom condition monitoring system 40 may be configured to compare and match a left-side image 400 of a vehicle bottom image that stores recorded frame 5 from recorded frame 1 stored based on a moving distance with a current left-side image displayed on the SVM.

The virtual vehicle bottom condition monitoring system 40 may be configured to compare and match a right-side image 600 of the vehicle bottom image that stores recorded frame 5 from recorded frame 1 stored based on a moving distance with a current right-side image displayed on the SVM. Additionally, the virtual vehicle bottom condition monitoring system 40 may be configured to compare and match the frame stored based on the moving distance with current left-side and right-side image frames based on the left-side and right-side images that are currently displayed on the SVM.

Figure 6:
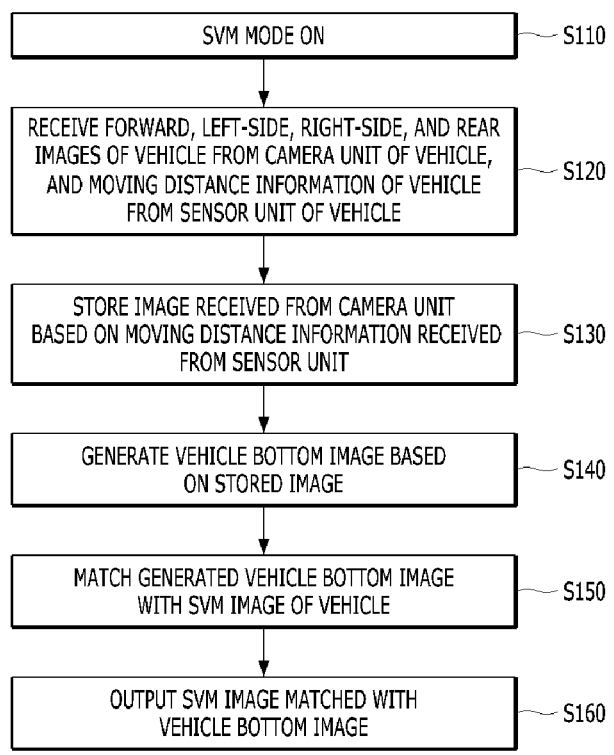
FIG. 6 is a flowchart showing a method of monitoring a vehicle bottom condition according to an exemplary embodiment of the present disclosure.

FIG. 6 is a flowchart showing a method of monitoring a vehicle bottom condition according to an exemplary embodiment of the present disclosure. Referring to FIG. 6, when an SVM mode of a vehicle is ON (S110), forward, left-side, right-side, and rear images of the vehicle from the camera unit 20 of the vehicle, and moving distance information of the vehicle from the sensor unit 30 of the vehicle may be received to output a vehicle bottom image (S120).

After operation S120, the image received from the camera unit 20 may be stored based on the moving distance information received from the sensor unit 30 (S130). After operation S130, the vehicle bottom image may be generated based on the stored image (S140). After operation S140, the generated vehicle bottom image may be matched with the SVM image of the vehicle (S150). Further, after operation s150, an SVM image matched with the vehicle bottom image may be output (S160).

A method and system for monitoring a vehicle bottom condition according to the present disclosure may allow a driver to detect a vehicle bottom condition to view the vehicle bottom condition while driving the vehicle. Accordingly, a user may detect a condition that could damage a vehicle, for example, if a tire falls in a sink hole or the like and avoid the condition. In addition, an existing installed system may be upgraded with the present disclosure without increase in costs to enhance user satisfaction.

It will be appreciated by persons skilled in the art that that the effects that could be achieved with the present disclosure are not limited to what has been particularly described hereinabove and other advantages of the present disclosure will be more clearly understood from the detailed description.

The aforementioned method according to exemplary embodiments may also be embodied as computer readable code on a non-transitory computer readable recording medium. Examples of the non-transitory computer readable recording medium include read-only memory (ROM), random-access memory (RAM), CD-ROMs, magnetic tapes, floppy disks, optical data storage devices, etc. The non-transitory computer readable recording medium can also be distributed over network coupled computer systems so that the computer readable code is stored and executed in a distributed fashion. Additionally, functional programs, code, and code segments for accomplishing the present disclosure may be easily construed by programmers skilled in the art to which the present disclosure pertains.

What is claimed is:

1. A method of monitoring a vehicle bottom condition, comprising:
    receiving, by a controller, forward, left-side, right-side, and rear images of a vehicle from a camera unit of the vehicle, and traveling distance information of the vehicle from a sensor unit of the vehicle;
    storing, by the controller, the images received from the camera unit based on the traveling distance information received from the sensor unit;
    generating, by the controller, a vehicle bottom image based on the stored image;
    matching, by the controller, the generated vehicle bottom image with a surround view monitoring (SVM) image of the vehicle; and
    outputting, by the controller, the SVM image matched with the vehicle bottom image,
    wherein the generating of the vehicle bottom image in response to driving of the vehicle includes:
    generating, by the controller, a first frame of the vehicle bottom image based on the stored image; and
    after the generating the first frame, combining, by the controller, the forward or rear image with an existing frame based on a traveling distance and storing the vehicle bottom image, and
    wherein the storing of the vehicle bottom image includes storing, by the controller, each of forward and rear images of the vehicle bottom image, having a size up to twice an overall length of the vehicle.

2. The method of claim 1, wherein the generating of the first frame of the vehicle bottom image based on the stored image includes:
    receiving, by the controller, forward driving or backward driving information of the vehicle; and
    generating, by the controller, a vehicle bottom image in response to driving of the vehicle.

3. The method of claim 2, wherein the generating of the vehicle bottom image in response to driving of the vehicle includes:
    when the vehicle travels forward, generating, by the controller, a forward image of the vehicle bottom image by combining forward images of the stored image based on the traveling distance.

4. The method of claim 3, wherein the generating of the vehicle bottom image further includes generating, by the controller, a rear image of the vehicle bottom image.

5. The method of claim 4, further comprising in response to determining that a size of the combined forward image is the same as sum of an overall length of the vehicle and a size of a first forward image, storing, by the controller, the combined forward image as a first frame of the forward image of the vehicle bottom image.

6. The method of claim 2, wherein the generating of the vehicle bottom image in response to driving of the vehicle includes:
    when the vehicle travels backward, generating, by the controller, the vehicle bottom image by combining rear images of the stored image based on the traveling distance.

7. The method of claim 6, wherein the generating of the vehicle bottom image further includes generating, by the controller, a rear image of the vehicle bottom image.

8. The method of claim 7, further comprising: in response to determining that a size of the combined rear image is the same as an overall length of the vehicle, storing, by the controller, the combined rear image as a first frame of the rear image of the vehicle bottom image.

9. The method of claim 1, wherein the matching of the generated vehicle bottom image with the surround view monitoring (SVM) image of the vehicle includes:
   comparing and matching, by the controller, the frame stored based on a traveling distance with current left-side and right-side image frames based on left-side and right-side images that are currently displayed on the SVM.

10. A non-transitory computer-readable recording medium having recorded thereon a program for executing the method of claim 1.

11. A vehicle bottom condition monitoring system, comprising:
   a camera unit including a forward camera, a rear camera, a left-side camera, and a right-side camera;
   a sensor measuring a traveling distance of a vehicle, the sensor mounted on the vehicle;
   a virtual vehicle bottom condition monitoring system disposed in the vehicle, the virtual vehicle bottom conditioning monitoring system:
      receiving forward, left-side, right-side, and rear images of the vehicle from the camera unit, and traveling distance information of the vehicle from the sensor of the vehicle;
      storing the image received from the camera unit based on the traveling distance information received from the sensor;
      generating a vehicle bottom image based on the stored image; and
      matching the generated vehicle bottom image with a surround view monitoring (SVM) image of the vehicle; and
   a display outputting the SVM image matched with the vehicle bottom image to a driver, the display being mounted within the vehicle,
   wherein the virtual vehicle bottom condition monitoring system generates a first frame of the vehicle bottom image based on the stored image, and combines the forward or rear image with an existing frame based on the traveling distance and stores the vehicle bottom image after generating the first frame, and
   wherein the virtual vehicle bottom condition monitoring system stores each of forward and rest images of the vehicle bottom image, having a size up to twice an overall length of the vehicle.

12. The vehicle bottom condition monitoring system of claim 11, wherein the virtual vehicle bottom condition monitoring system receives forward driving or backward driving information of the vehicle, and generates a vehicle bottom image in response to driving of the vehicle.

13. The vehicle bottom condition monitoring system of claim 12, wherein, when the vehicle travels forward, the virtual vehicle bottom condition monitoring system generates the vehicle bottom image by combining forward images of the stored image based on the traveling distance.

14. The vehicle bottom condition monitoring system of claim 13, wherein the virtual vehicle bottom condition monitoring system generates a forward image of the vehicle bottom image.

15. The vehicle bottom condition monitoring system of claim 14, wherein, in response to determining that a size of the combined forward image is the same as sum of an overall length of the vehicle and a size of a first forward image, the virtual vehicle bottom condition monitoring system stores the combined forward image as a first frame of the forward image of the vehicle bottom image.

16. The vehicle bottom condition monitoring system of claim 12, wherein, when the vehicle travels backward, the virtual vehicle bottom condition monitoring system generates the vehicle bottom image by combining images of the stored image based on the traveling distance.

17. The vehicle bottom condition monitoring system of claim 16, wherein the virtual vehicle bottom condition monitoring system generates a rear image of the vehicle bottom image.

18. The vehicle bottom condition monitoring system of claim 17, wherein, in response to determining that a size of the combined rear image is the same as an overall length of the vehicle, the virtual vehicle bottom condition monitoring system stores the combined rear image as a first frame of the rear image of the vehicle bottom image.

19. The vehicle bottom condition monitoring system of claim 11, wherein the virtual vehicle bottom condition monitoring system compares and matches the frame stored based on the traveling distance with current left-side and right-side image frames based on left-side and right-side images that are currently displayed on the SVM.

* * * * *